United States Patent
Dworak et al.

(10) Patent No.: US 6,350,796 B1
(45) Date of Patent: Feb. 26, 2002

(54) IONICALLY ON NONIONICALLY STABILIZED EPOXY ADDUCTS AS WATER-DILUTABLE BASE RESINS FOR 2-COMPONENT ISOCYANATE CROSSLINKABLE SYSTEMS

(75) Inventors: Gert Dworak; Martin Gerlitz; Roland Feola; Manfred Weinberger, all of Graz (AT)

(73) Assignee: Vianova Resins AG, Werndorf (AT)

( * ) Notice: Subject to any disclaimer, the term of this patent is extended or adjusted under 35 U.S.C. 154(b) by 0 days.

(21) Appl. No.: 09/427,435

(22) Filed: Oct. 26, 1999

(30) Foreign Application Priority Data

Oct. 28, 1998 (AT) .............................................. 1796/98

(51) Int. Cl.$^7$ ............................. C08K 3/20; C08L 63/02
(52) U.S. Cl. ...................... 523/407; 523/410; 523/415; 523/423; 523/428
(58) Field of Search ................................. 523/407, 410, 523/415, 423, 428; 524/591, 839, 845

(56) References Cited

U.S. PATENT DOCUMENTS

| 4,719,135 A | 1/1988 | Gerdes et al. |
| 4,871,807 A | 10/1989 | Startizbichler et al. |
| 4,892,897 A | * 1/1990 | Redman ..................... 523/404 |
| 5,633,297 A | 5/1997 | Valko et al. |
| 5,977,247 A | * 11/1999 | Schafheutle et al. ........ 524/591 |

FOREIGN PATENT DOCUMENTS

| AT | 356779 B | 5/1980 |
| AT | 384820 B | 1/1988 |
| DE | 3041700 A1 | 6/1982 |
| DE | 3300583 A1 | 7/1984 |
| DE | 3311513 A1 | 10/1984 |
| GB | 1531621 | 11/1978 |

* cited by examiner

Primary Examiner—Robert Dawson
Assistant Examiner—D. Aylward
(74) Attorney, Agent, or Firm—Frommer Lawrence & Haug LLP

(57) ABSTRACT

Two-component systems based on aqueous dispersions of hydrophilic epoxy adducts Ah having hydroxyl groups as reactive groups and unblocked difunctional or polyfunctional isocyanates B, said hydrophilic epoxy adducts Ah being selected from cationically stabilized hydrophilic epoxy adducts Ak, anionically stabilized hydrophilic epoxy adducts Aa and also nonionically stabilized epoxy adducts An and zwitterionically stabilized epoxy-amine adducts Aak.

17 Claims, No Drawings

IONICALLY ON NONIONICALLY STABILIZED EPOXY ADDUCTS AS WATER-DILUTABLE BASE RESINS FOR 2-COMPONENT ISOCYANATE CROSSLINKABLE SYSTEMS

RELATED APPLICATIONS

This application claims priority to Austrian application No. A 1796/98, filed Oct. 28, 1998, herein incorporated by reference.

FIELD OF THE INVENTION

This invention relates to two-component isocyanate crosslinkable systems based on aqueous dispersions of hydrophilic epoxy adducts. This invention also relates to binders containing the systems according to the present invention and a method for coating material using said binders.

Description of the Related Art

In unmodified form, epoxy resins, especially those based on bisphenol A which are commonly used commercially, are insoluble or of very low solubility in water. This means that an aqueous phase which is in equilibrium with the epoxy resin has a mass fraction of less than 1% of the epoxy resin. In principle, it is possible to obtain water-dilutable, cationically stabilized base resins by reacting epoxy resins with amines and then protonating the basic groups. By modifying the epoxy resin with nonionic hydrophilic groups or with anionic groups, it is likewise possible to achieve a limited solubility which is sufficient to give adequate stability to a dispersion of the particular modified epoxy resin in water. Such dispersions can be diluted with (additional) water. The modified epoxy resin can then be processed from the aqueous dispersion; after the water fraction has been removed by evaporation or after penetration into the substrate, the resin remains on the surface and, given a adequate composition of the disperse phase, forms a coalesced film which can be crosslinked chemically by adding appropriate curing agents.

In the case of the cationically modified epoxy resins, dilutability in water is achieved by neutralizing some or all of the basic groups of the epoxy-amine adduct with acids, such as formic acid, acetic acid or lactic acid, for example. In this case the level of basic amine groups in the epoxy-amine adduct (measured, for example, by way of the amine number; see below) and the degree of neutralization of said groups (i.e., the fraction of ionic groups) are critical for the extent of dilutability in water.

When formulating the batches care must be taken to ensure that the base resins have the level of amine groups required to ensure sufficient stability of the aqueous solution of the binder. Experience indicates a target amine number in the range from 30 to 100 mg/g.

A degree of neutralization of from 20 to 60% of the basic amine groups is usually sufficient for practical dilutability. The base resins are then diluted to the desired concentration using deionized water. The resin dispersions obtained in this way range from virtually clear to highly opaque and should have a readily manipulable viscosity in the range from about 100 to 4000 mPa.s at ambient temperature.

Cationically stabilized epoxy adducts of this kind are part of the prior art and have already been described on numerous occasions in the patent literature. In the field of cataphoretic electrodeposition coating, in particular, they are successfully employed in combination with blocked difunctional or oligofunctional isocyanates (see, for example, Austrian Patent Applications AT 1665/86, AT 1766/78, and German Patent Applications DE-A 30 41 700, DE-A 33 00 583, DE-A 33 11 513). If desired, they are subsequently processed further with crosslinking catalysts, pigments, fillers and other additives to form pigmented paints.

In contrast to electrodeposition coating applications, where the formulation of the base resins and thus the number and nature of the ionogenic groups strongly influence the electrophoretic applicability, the criteria governing, for example, the interior spray coating of drums are different.

One particular problem affecting the combination of water-diluted epoxy-amine adducts with unblocked isocyanates is the often very short processing time (pot life). Because of the basic medium, the unblocked isocyanate groups react with water even before baking, during application. This results in film defects due to gas bubbles (the reaction of isocyanate with water produces the corresponding amines and carbon dioxide) and reduced film crosslinking, since part of the crosslinking agent is consumed by the reaction with the water.

The epoxy-amine adducts which are commonly employed in cataphoretic electrodeposition coating generally include a fraction of strongly basic amino groups with little steric hindrance, since such groups result in particularly favorable electrochemical deposition properties. For the reason given above, such adducts are poorly suited to combination with unblocked isocyanates.

It has surprisingly now been found that, under certain conditions, water-diluted epoxy adducts can be combined with unblocked isocyanates to form 2-component systems without entailing problems with film defects due to gas bubbles or inadequate film crosslinking.

SUMMARY OF THE INVENTION

The present invention therefore provides two-component systems based on aqueous dispersions of hydrophilic epoxy adducts Ah having hydroxyl groups as reactive groups and unblocked difunctional or polyfunctional isocyanates B. The hydrophilic epoxy adducts Ah can be selected from cationically stabilized hydrophilic epoxy adducts Ak, anionically stabilized hydrophilic epoxy adducts Aa and nonionically stabilized epoxy adducts An.

DETAILED DESCRIPTION OF THE INVENTION

For this purpose it is necessary first of all, in the case of the cationically stabilized epoxy-amine adducts Ak, that only tertiary amino groups and not primary or secondary amino groups are present in the epoxy-amine adduct. The tertiary amino groups present must, furthermore, be sterically hindered. This is achieved by careful selection of the amines used and, in the course of synthesis, by direct attachment of the amino groups to epoxy groups without the formation of terminal amine groups in aliphatic side chains.

Owing to these conditions, amines such diethylaminopropylamine or dimethylaminopropylamine, for example, are unsuitable as raw materials since epoxy-amine adducts prepared from them contain terminal amino groups in aliphatic side chains. Amines which have proven particularly suitable, on the other hand, are those which carry either short-chain branched alkyl groups or hydroxyalkyl groups. When an adduct is formed with oxirane groups of the epoxy component, the result is then tertiary amine structures with strong steric hindrance which can nevertheless still be neutralized effectively with acids and so contribute to the water-solubility of the resins. In the case of the amines which carry hydroxyalkyl groups, additional OH groups are incorporated into the resin assembly and may act as crosslinking sites with, for example, isocyanate groups.

An important criterion for the epoxy-amine adducts Ak suitable for the invention is a sufficiently high number of OH groups, which are groups that are capable of crosslinking with isocyanates. OH numbers in the range from about 150 to about 400 mg/g have been found suitable.

The invention therefore provides two-component binders for the interior coating of drums, consisting of a cationically stabilized epoxy component Ak and a crosslinking agent B, wherein component Ak comprises exclusively those tertiary amino groups which are formed in the addition reaction from the amine component A2 and the epoxy component A1, and wherein the amine component A2 has a primary or secondary amino group and has no tertiary amino groups.

Compounds which can be employed as crosslinking agent B are in principle all those which undergo addition or condensation reactions with hydroxyl-containing compounds. Crosslinking agents B which have been found suitable in the context of the invention are primarily those which carry at least two unblocked isocyanate groups per molecule. Only using isocyanate crosslinking agents of this kind is it possible to produce chemically resistant coatings which cure rapidly.

Particularly suitable isocyanates are low molar mass isocyanates which are liquid at room temperature, having a viscosity of from about 50 to about 10,000 mPa.s. In these isocyanates, the isocyanate groups can be attached to aliphatic, aromatic or a mixture of aromatic and aliphatic structures. Use is made in particular of polyfunctional isocyanates or mixtures thereof having an average isocyanate functionality of from about 2 to about 5. In the context of the invention it is also possible to employ isocyanates which are solid at room temperature or are of relatively high viscosity, with inert solvents being added in order to lower the viscosity. Use is made in particular of solvents rich in aromatics, such as solvent naphtha, for example. Likewise suitable are the so-called paint isocyanates, which are obtainable by dimerization, trimerization or oligomerization of diisocyanates such as 1,6-diisocyanatohexane, 2,4- and 2,6-tolylene diisocyanate or isophorone diisocyanate to form the known biurets, uretdiones, isocyanurates or allophanates.

The epoxy component A1 is a commercially customary epoxy resin based on aliphatic or aromatic polyols, preferably diols, having a specific epoxide group content of from about 300 to about 11,500 mmol/kg. The specific epoxy group content SEG is defined as the ratio of the amount of substance of epoxide groups n(EP) in a sample and the mass $m_B$ of the sample (and is therefore the reciprocal of the so-called EV value or epoxide equivalent weight (EEW)); the customary unit of measurement is mmol/kg:

$$SEG=n(EP)/m_B$$

Preference is given to epoxy resins based on bisphenol A and bisphenol F or mixtures thereof, having a SEG of from about 500 to about 10,000 mmol/kg. In addition, epoxy resins based on polypropylene glycol and having a SEG of from about 500 to about 5000 mmol/kg are also employed with preference.

The amine component A2 is preferably selected from secondary monoamines $R^1R^2NH$, $R^1$ and $R^2$ being selected independently of one another from the group consisting of linear, branched and cyclic alkyl radicals of 1 to 20 carbon atoms which if desired carry at least one primary hydroxyl group; preferably of 1 to 4 carbon atoms. A2 can further be selected from the group consisting of primary monoamines $R^3NH_2$, $R^3$ being selected from linear, branched and cyclic alkyl groups of 2 to 20 carbon atoms, preferably 3 to 12 carbon atoms, with the proviso that $R^3$ carries at least one primary hydroxyl group which is positioned α or β to the primary amino group. Examples of suitable amines are diisopropanolamine, diethanolamine, diisopropylamine, diisobutylamine, N-methylcyclohexyl-amine, monoisopropanolamine and monoethanolamine.

The component Ak is obtainable by reacting an epoxy resin A1 having at least two epoxy groups per molecule with amines A2. This reaction is performed by first of all introducing the epoxy resin or a mixture of two or more epoxy resins and heating this initial charge to a reaction temperature of from about 80 to about 160° C., preferably from about 100 to about 140° C. By adding preferably aromatic polyols such as bisphenol A or bisphenol F, and using suitable catalysts, it is possible to reduce the specific epoxy group content in the manner of an advancement reaction. It is preferred to add inert solvents in order to lower the viscosity. After cooling to 60–100° C., the amine component is added. The reaction is at an end when the specific epoxy group content is less than about 50 mmol/kg (EEW greater than 5 20,000 g/mol). After that, the solvent is removed by distillation, and the epoxy-amine adduct is at least partly neutralized with an aqueous acid, preferably an organic acid such as formic acid, lactic acid or citric acid, and is dispersed by addition of water, preferably in a plurality of portions, with thorough mixing.

DIN 53 176 defines the amine number as being the ratio of that mass $m_{KOH}$ of potassium hydroxide which consumes exactly the same amount of acid for neutralization as the sample under analysis to the mass $m_B$ of this sample (mass of the solid matter in the sample in the case of solutions or dispersions); its customary unit is "mg/g".

DIN 53 240 defines the hydroxyl number as being the ratio of that mass $m_{KOH}$ of potassium hydroxide which has exactly the same number of hydroxyl groups as the sample under analysis to the mass $m_B$ of this sample (mass of the solid matter in the sample in the case of solutions or dispersions); its customary unit is "mg/g".

A hydroxyl number of from about 150 to about 400 mg/g has proven suitable in order to obtain the required film properties such as crosslinking density, substrate adhesion, and flexibility.

The present invention additionally provides a two-component system comprising an anionically stabilized water-dilutable epoxy resin Aa and an isocyanate-functional crosslinker B.

One possibility of rendering epoxy resins dilutable in water with the aid of anionic or anionogenic groups is to modify the epoxy resin with acidic groups, especially with phosphoric acid groups or phosphonic acid groups. For this purpose the epoxy resins A1 can be reacted with polybasic acids A3 selected from phosphoric acid, alkyl-phosphonic acids $R^4PO_3H_2$ of 1 to 18 carbon atoms, preferably 1 to 4 carbon atoms, in the alkyl group $R^4$, aryl-phosphonic acids and hydroxyalkylphosphonic acids of preferably 1 to 4 carbon atoms in the alkyl group, and with the corresponding phosphonous acids $R^4PO_2H_2$ in solution (with ketones, monoalcohols or mixtures of ketones and alcohols as solvent, for example); in this reaction, opening of the oxirane ring results in the formation of acidic β-hydroxy esters Aa. About 1.0 mol of A3, preferably up to about 0.5 mol of A3, is used per mole of oxirane groups. The acid number of this epoxy-acid adduct Aa is preferably between about 15 and about 200 mg/g, with particular preference between about 20 and about 150 mg/g and, in particular, between about 25 and about 100 mg/g. To improve the solubility or dilutability in water, the adduct is subjected to at least partial neutralization, the degree of neutralization preferably being between about 10 and about 100% and, with particular preference, between about 20 and about 70%.

DIN 53 402 defines the acid number as being the ratio of that mass $m_{KOH}$ of potassium hydroxide which is required to neutralize the sample under analysis to the mass $m_B$ of this sample (mass of the solid matter in the sample in the case of solutions or dispersions); its customary unit is "mg/g".

Instead of the epoxides A1 themselves it is also possible here to employ modified epoxides A16 which are obtainable by reacting the epoxides A1 with monocarboxylic acids A6 selected from saturated and unsaturated aliphatic carboxylic acids of 2 to 40 carbon atoms, preferably 8 to 18 carbon atoms, and aromatic mono-carboxylic acids whose aromatic ring can be substituted by alkyl, alkoxy, hydroxyl or halogen groups. In this case, the amounts of the reactants should be such that the molar amount of the carboxyl groups in A6 is less than or equal to about 40% of the molar amount of the epoxy groups in A1, preferably less than or equal to about 20% of this molar amount. This means that at least about 60% or, respectively, at least about 80% of the oxirane groups are unreacted in this reaction.

Anionically modified epoxy resins which can be employed for the invention can also be obtained by reacting mixtures of modified epoxy resins according to A16 and epoxy resins A1 with the polybasic acids according to A3 in solution.

A further class of epoxy resin-based binder which can be combined with unblocked isocyanates to form two-component systems is that of epoxy resins Aak having zwitterionic character. For this purpose, adducts A12 are prepared first of all from drying, oils A121, unsaturated fatty acids A122 or mixtures of these two components A121 and A122 with maleic anhydride A123. It is also possible to prepare individual adducts of the drying oils A121 and of the fatty acids A122 with maleic anhydride A123 and then to mix these adducts. The anhydride groups of these adducts are hydrolyzed by reaction with water or monoalcohols to give in each case two carboxylic acid groups or one carboxylic acid group and one ester group. Hydroxyl-containing epoxy-amine adducts A18, which are obtainable by reacting epoxy resins A1 with secondary amines A8, are subsequently condensed with these hydrolyzed adducts A12h. The mass fraction of the building blocks in the condensation product that originates from the hydrolyzed adducts A12h is up to about 40%, preferably between about 10 and about 35%. The acid number of the condensation product Aak is from about 10 to about 100 mg/g, preferably from about 15 to about 95 mg/g and, in particular, from about 20 to about 90 mg/g. The condensation step produces zwitterionic compounds Aak which are soluble or dispersible in water with the formation of anions by neutralization with amines or aqueous ammonia or of cations by neutralization with acids.

To prepare the epoxy-amine adducts A18 described above, it is also possible, instead of the epoxides A1, to employ those epoxy resins, described above as A16, which are obtainable beforehand by reacting the epoxides A1 with the above-described monocarboxylic acids A6. In this case the amounts of the reactants should be such that the molar amount of the carboxyl groups in A6 is less than or equal to about 40% of the molar amount of the epoxy groups in A1, preferably less than or equal to about 20% of this molar amount. This means that at least about 60% (or at least about 80%) of the oxirane groups are unreacted in this reaction. It is also possible to employ modified epoxy resins A17 which are obtainable by reacting epoxy resins A1 with polyhydroxy compounds A7, especially with aliphatic dihydroxy compounds selected from α,ω-diols of 2 to 8 carbon atoms and polyoxyalkylene glycols of 2 to 4 carbon atoms in the alkylene radical, with catalysis by, in particular, Lewis acids or adducts of Lewis acids with Lewis bases, examples being boron trifluoride, boron trifluoride etherates, tetrafluoroboric acid, antimony pentafluoride, hexafluoroantimonic acid, etc. Here again it is the case that the amounts of reactants A1 and A7 should be chosen such that the amount of substance of the hydroxyl groups in A7 is less than or equal to about 40% of the amount of substance of the epoxy groups in A1, preferably less than or equal to about 20% of this amount of substance.

Particularly suitable amines A8 are secondary aliphatic amines having linear, branched or cyclic alkyl radicals of preferably 2 to 12 carbon atoms, which if desired also carry hydroxyl groups. Particularly suitable examples are diethanolamine and diisopropanolamine.

Examples of suitable drying oils A121 are linseed oil, wood oil, hemp oil, poppyseed oil, walnut oil, perilla oil, oiticica oil, safflower oil and fish oils and also dehydrated castor oils; particular preference is given to castor oils, safflower oil and linseed oil. It is particularly preferred to transesterify mixtures of drying oils by heating them together, alone or in the presence of catalysts, and then reacting the product with maleic anhydride as component A123. The resulting adduct is subsequently hydrolyzed by adding a sufficient amount of water or of a monoalcohol, which is accompanied by the liberation of carboxyl groups and, if appropriate, the formation of an ester group. Suitable unsaturated fatty acids A122 have 6 to 30 carbon atoms and at least one olefinic double bond; examples are palmitoleic acid, oleic acid, erucic acid, linoleic and linolenic acid, elaeostearic acid and arachidonic acid, and also the commercially customary mixtures of these.

In the context of the invention it is also possible to subject epoxy resins to anionic modification by first of all reacting hydroxy acids, mercapto acids or amino acids A4 having at least one isocyanate-reactive group selected from hydroxyl, amino and mercapto groups and at least one acid group selected preferably from carboxyl, sulfonic acid and phosphonic acid groups with an at least difunctional isocyanate A5 to give an intermediate A45 having at least one acid group and at least one isocyanate group. The acids employed preferably for this embodiment have acid groups which owing to steric hindrance do not themselves react, or react only very slowly, with isocyanate to form an amide and to liberate carbon dioxide. The intermediate A45 is subsequently reacted with a hydroxyl-containing epoxy resin A14, the proportions being chosen such that all of the isocyanate groups are consumed.

The hydroxyl-containing epoxy resins A14 are known and can be prepared, for example, by reacting diglycidyl ethers of diols with organic compounds having at least one oxirane-reactive hydroxyl group. The isocyanates A5 are likewise known and are selected from aliphatic, aromatic and mixed aromatic-aliphatic isocyanates having at least two isocyanate groups. Suitable examples are 2,4- and 2,6-tolylene diisocyanate, 1,6-diisocyanatohexane, isophorone diisocyanate and tetramethylxylylene diisocyanate. The acids A4 are, for example, aliphatic hydroxycarboxylic acids such as lactic acid, citric acid, tartaric acid and dimethylolpropionic acid, amino acids such as taurine, lysine and aspartic acid, or phosphonic acids such as hydroxymethanephosphonic acid.

The present invention additionally provides a two-component system comprising a nonionically stabilized water-dilutable epoxy resin An and an isocyanate-functional crosslinker B. Nonionically modified hydrophilic epoxy resins An are derived in particular from epoxy resins which include segments of oxyalkylene groups (preferably oxyethylene groups or mixtures thereof with oxypropylene groups). With these modified resins, of course, no neutralization is required in order to improve the dilutability with water. Particular preference is given to oxyalkylene segments which include a mass fraction of at least about 20%, preferably from about 40 to about 100% and, with particular preference, from about 50 to about 90% of oxyethylene groups.

The binders of the present invention are particularly suitable for the interior coating of containers which come into contact with aggressive chemicals.

Abbreviations Used:

Abbrev. Meaning Unit

EEW Epoxide equivalent weight, EV value g/mol

SEG Specific epoxy group content mmol/kg

OHN Hydroxyl number mg/g

AN Amine number mg/g

Nvc Nonvolatiles content (mass fraction of solids of g/ the resin solution or resin dispersion) (100 g)

$M_W$ Weight-average molar mass g/mol

EP 1 Diepoxy resin based on bisphenol A (SEG=5405 mmol/kg; EEW about 185 g/mol)

EP 2 Diepoxy resin based on bisphenol A (SEG=1080 mmol/kg; EEW about 925 g/mol)

EP 3 Diepoxy resin based on polypropylene glycol (SEG= 2940 mmol/kg; EEW about 340 g/mol)

EP 4 Diepoxy resin based on bisphenol A (SEG=2000 mmol/kg; EEW about 500 g/mol)

In the examples below, as in the text which precedes them, all data with the unit "%" denote mass fractions with the unit "g/(100 g)" unless indicated otherwise. Parts are always parts by mass. Concentration data in "%" are mass fractions of the dissolved substance in the solution.

The formerly so-termed "intrinsic viscosity number", referred to in accordance with DIN 1342, part 2.4, as "Staudinger Index" $J_g$, is the limiting value of the Staudinger function $J_v$ at decreasing concentration and shear stress, $J_v$ being the relative change in viscosity $\eta_r-1=(\eta-\eta_s)/\eta_s$ related to the mass concentration $\beta_B=m_B/V$ of the dissolved substance B (with the mass $m_B$ of the substance in the volume V of the solution); i.e. $J_V=(\eta_r-1)/\eta_B$. Here, $\eta$ denotes the viscosity of the solution under analysis and $\eta_s$ the viscosity of the pure solvent. (The physical definition is that of a specific hydrodynamic volume of the solvated polymer coil at infinite dilution and in the state of rest.) The unit commonly used for J is "$cm^3/g$"; formerly often "dl/g".

EXAMPLES OF CATIONICALLY STABILIZED EPOXY-AMINE ADDUCTS

Example K1

A suitable reaction vessel equipped with stirrer, thermometer, feed vessel and distillation apparatus was charged with 1850 g of EP 2 (2.0 mol of epoxide groups) and this initial charge was first of all melted without stirring (melting point about 80° C.). It was then heated to 120° C. with stirring and diluted in portions with a total of 460 g of methoxypropanol. It was then cooled to 70° C., and 210 g (2.0 mol) of diethanolamine were added rapidly. After the exothermic reaction had subsided, the batch was held at 90° C. until the SEG was below 50 mmol/kg (EEW of>20,000 g/mol). Following removal of the solvent by distillation, the resin was partially neutralized by adding 379 g of 10% strength formic acid (amount of substance of formic acid based on the nonvolatiles content of the resin: 40 mmol/100 g) and following a homogenization period of 1 hour was diluted in portions with water to a mass fraction of solids of 35%.

AN 54 mg/g

OHN 326 mg/g

Example K2

A suitable reaction vessel equipped with stirrer, thermometer, feed vessel and distillation apparatus was charged with a mixture of 274 g (1.2 mol) of bisphenol A, 481 g (corresponding to 2.6 mol of epoxide groups) of EP 1 and 136 g (corresponding to 0.4 mol of epoxide groups) of EP 3 and this initial charge was heated to 120° C. with stirring. Following the addition of 0.3 g of triphenyl phosphino it was heated to 160° C., utilizing the slight exothermic reaction which occurs. It was maintained at this temperature until a SEG of about 770 mmol/kg (EEW of 1300 g/mol) was reached. It was subsequently cooled to 120° C. and diluted with 200 g of methoxypropanol. After cooling to 70° C., 63 g (0.6 mol) of diethanolamine were added rapidly and the temperature was raised to 90° C. utilizing the exothermic reaction. The batch was held at this temperature until the SEG reached below 50 mmol/kg (EEW of>20,000 g/mol). Following removal of the solvent by distillation, the resin was partially neutralized by adding 229 g of 10% strength acetic acid (amount of substance of acetic acid based on the nonvolatiles content of the resin: 40 mmol/100 g) and following a homogenization period of 1 hour was diluted in portions with water to a mass fraction of solids (Nvc) of 38%.

AN 35 mg/g

OHN 246 mg/g

Example K3

1850 g (2.0 mol of epoxide groups) of EP 2; 202 g (2.0 mol) of diisopropylamine; and 400 g of methoxypropanol were employed;

procedure as described in Example 1. Partial neutralization with 40 mmol of lactic acid per 100 g of solids in the resin.

Nvc 40%

AN 54 mg/g

OHN 218 mg/g

Example K4

1850 g (2.0 mol of epoxide groups) of EP 2; 133 g (1.0 mol) of diisopropanolamine; 105 g (1.0 mol) of diethanolamine; 400 g of methoxypropanol were employed;

procedure as described in Example 1. Partial neutralization with 10% strength formic acid (amount of substance of formic acid based on the nonvolatiles content of the resin: 50 mmol/100 g)

Nvc 37%

AN 54 mg/g

OHN 322 mg/g

Example K5

274 g (1.2 mol) of bisphenol A; 296 g (1.6 mol of epoxide groups) of EP 1; 272 g (0.8 mol of epoxide groups) of EP 3; 0.3 g of triphenylphosphine; 37 g (0.6 mol) of monoethanolamine; 200 g of methoxypropanol were employed;

procedure as described in Example 2. Partial neutralization with 50 mmol of formic acid per 100 g of nonvolatiles content in the resin.

Nvc 40%
AN 38 mg/g
OHN 191 mg/g

Example K6

228 g (1.0 mol) of bisphenol A; 76 g (1.0 mol) of propylene glycol; 1110 g (6.0 mol of epoxide groups) of EP 1; 0.5 g of triphenylphosphine; 101 g (1.0 mol) of diisopropylamine; 133 g (1.0 mol) of diisopropanolamine; 250 g of methoxypropanol were employed;

procedure as described in Example 2. Partial neutralization with 40 mmol of formic acid per 100 g of nonvolatiles content in the resin.

Nvc 38%
AN 68 mg/g
OHN 272 mg/g

Example K7

2000 g (4.0 mol of epoxide groups) of EP 4; 75 g (1.0 mol) of monoisopropanolamine; 210 g (2.0 mol) of diethanolamine; 550 g of methoxypropanol were employed;

procedure as described in Example 1. Partial neutralization with 50 mmol of formic acid per 100 g of nonvolatiles content in the resin.

Nvc 36%
AN 73 mg/g
OHN 318 mg/g

Anionically stabilized epoxy adducts as base resins for 2-component isocyanate systems

Example A1

Component (A)

In a suitable reaction vessel, a mixture of 165 parts of dehydrated castor oil and 135 parts of linseed oil was transesterified at 250° C. for 1 hour. After this mixture had cooled to 170° C., 100 parts of maleic anhydride were added and reaction was conducted at 210° C. until free maleic anhydride could no longer be detected. The adduct was cooled to 90° C. and, following the addition of a mixture of 30 parts of water and 3 parts of triethylamine, was hydrolyzed until an acid number of about 200 mg/g was reached. The batch was then diluted with methoxypropanol to a mass fraction of solids of 90%.

Component (B):

475 parts of a bisphenol A epoxy resin (SEG=2100 mmol/kg; EEW about 475 g/mol) were dissolved in 100 parts of diethylene glycol dimethyl ether (DGM). At 80° C., a mixture of 105 parts of diethanolamine and 45 parts of DGM was added and reaction was carried out until conversion was virtually complete. The batch was then adjusted with methyl ethyl ketone to a mass fraction of solids of 65% and the Staudinger Index $J_g$ ("intrinsic viscosity number" measured in dimethylformamide at 20° C.) was raised to 10 cm$^3$/g by adding, in portions, about 15 parts of tolylene diisocyanate. The solvent was subsequently stripped off completely under reduced pressure.

Combination According to the Invention 22 parts of component (A) and 80 parts of component (B) were mixed and adjusted to a mass fraction of solids of 85% using methoxypropoxypropanol. Partial condensation was carried out at 100° C. until a Staudinger Index $J_g$ (measured in dimethylformamide at 20° C.) of 16 cm$^3$/g was reached. The acid number of the condensation product was between 25 and 35 mg/g. After cooling, the batch was neutralized with 6 parts of dimethylethanolamine and diluted to a mass fraction of solids of 35% using deionized water.

Example A2

190 g of a diepoxy resin based on bisphenol A (SEG=5155 to 5495 mmol/kg; epoxide equivalent weight 182 to 194 g/mol) were esterified at 160° C. with 84 g (0.3 mol) of linseed oil fatty acid to an acid number of less than 3 mg/g and diluted with 29.5 g of diacetone alcohol to a mass fraction of solids of 90%. A mixture of 304 g of the epoxy ester prepared above and 267.2 g of a solution of 213.75 g of a diepoxy resin based on bisphenol A (0.45 mol of oxirane groups; Durran melting point 64 to 74° C.; specific hydroxyl group content 0.32 mol/100 g) in diacetone alcohol was added in portions to a solution of 60 g of a 75% strength aqueous solution of orthophosphoric acid (0.46 mol) and 130 g of diacetone alcohol at 50 C and reaction was conducted until the oxirane content was zero. The product had an acid number of 92.3 mg/g and following neutralization with triethylamine gave a virtually clear solution in water. The mass fraction of solids of the binder was adjusted to 70% using diacetone alcohol.

Example A3

12.8 g (0.115 mol) of hydroxymethanephosphonic acid, 4.5 g of deionized water and 64.7 g of methyl ethyl ketone were heated to 70° C. A solution of 256 g of diacetone alcohol and 475 g (1 mol of oxirane groups) of a diepoxy resin based on bisphenol A (Durran melting point 64 to 74° C., specific hydroxyl group content 0.32 mol/100 g) was added in portions with stirring. The temperature was maintained until the oxirane content had fallen to zero. The reaction product had an acid number of 14 mg/g and following neutralization with triethylamine gave a slightly opaque solution in water. The mass fraction of solids of the binder was adjusted to 70% using diacetone alcohol.

Example A4

39 g (0.3 mol) of a 75% strength aqueous solution of orthophosphoric acid and 116 g of diacetone alcohol were heated to 65° C. A solution of 210 g of diacetone alcohol and 475 g (1 mol of oxirane groups) of a diepoxy resin based on bisphenol A (Durran melting point 64 to 74° C., specific hydroxyl group content 0.32 mol/100 g) was added in portions with stirring. The temperature was maintained until the oxirane content had fallen to zero. The product had an acid number of 69.4 mg/g. Following neutralization with 36 g of dimethylethanolamine, 177 g of diacetone alcohol were stripped off under reduced pressure at about 95° C. The product was subsequently diluted with deionized water to a mass fraction of solids of 25%.

Example A5

Epoxide Group-free EP Dispersion, Anionically Stabilized 446 g of a 30% strength solution of dimethylolpropionic acid in N-methylpyrrolidone (1 mol of carboxyl groups) were added dropwise to 348 g of a technical-grade mixture of 2,4- and 2,6-tolylene diisocyanate (2 mol) without exceeding a temperature of 30° C. The mixture was held at 30 C until the theoretical NCO content of about 10.5% was reached. Then 30 g (0.5 mol) of isopropanol were added dropwise and the mixture was held at 60° C. until an NCO content of 7.6% was reached. At this point, this precursor was added to a dilution of 1360 g of an epoxy resin which had been reacted with phenol until all of the epoxy groups had been consumed by reaction, said epoxy resin having been produced from bisphenol A diglycidyl ether and bisphenol A (®Beckopox EM 460 from Vianova Resins GmbH), in 600 g of xylene at 80° C. and the mixture was held at from 90 to 100° C. until free isocyanate groups could no longer be detected. It was then neutralized with an aqueous solution of lithium hydroxide and diluted with fully deionized water. The xylene auxiliary solvent was removed completely from the aqueous solution by distillation using the azeotrope method. This gave a dispersion having the following characteristics:

Degree of neutralization 60%

Nvc (5 min, 125□C, film method) 40%

Viscosity (ISO 3219) 2500 mPa.s

Mass fraction of N-methylpyrrolidone in the dispersion 6.7%

Example N1

Preparation of an Emulsifier 309 g of technical-grade polyethylene glycol having a weight-average molar mass $M_w$ of 4000 g/mol and 34.1 g of a polyglycidyl ether based on bisphenol A and having a specific epoxy group content SEG of about 5465 mmol/kg (epoxide equivalent weight of 183 g/mol) were heated together to 100° C., and 0.35 ml of 50% strength aqueous tetrafluoroboric acid was added with stirring. The ratio of the number of OH groups to the number of epoxy groups was 1:1.20. The mixture was heated further to 130° C. and was maintained at this temperature until the SEG of the condensation product was about 2.9 mmol/kg (epoxide equivalent weight about 350,000 g/mol). After cooling, the emulsifier prepared in this way had a brittle, waxlike solid consistency.

360 g of bisphenol A diglycidyl ether (SEG about 5560 mmol/kg, EEW about 180 g/mol) were heated to about 110° C. and 108.3 g of bisphenol A and 70 g of the emulsifier described above were added. The temperature was raised to about 125° C. and 0.9 g of triphenylphosphine was added, whereupon there ensued an exothermic reaction. After the exothermic reaction had subsided, the mixture was held at 160° C. until it had an SEG of about 1949 to 1960 mmol/kg (EEW of 510 to 515 g/mol). It was subsequently cooled and, from 100° C., fully deionized water was added until phase inversion took place. The batch was then subjected to shearing for 1 hour with a high stirrer output, after which it was diluted further with water.

The Result Was a Storage-stable Dispersion Having the Following Characteristics

Nvc (5 min, 120° C.; film method) 53%

SEG (dispersion in the stated concentration) 1000 mmol/kg

Viscosity of the dispersion (ISO 3219) 12,000 mPa.s

Performance Testing of Selected Patent Examples

The numerical data in the formulation are mass fractions. Seconds are abbreviated to "s", minutes to "min" and hours to "h". The baking conditions relate to the temperature of the article.

| Cationically stabilized epoxy adducts: | | | |
|---|---|---|---|
| Epoxy dispersion of Example | K2 | K2 | K2 |
| Polyisocyanate | Bayhydur VP LS 2150/1 | Bayhydur VP LS 2219 | Bayhydur B 3100 |
| Ratio of the amounts of substance of the reactive groups n(OH):n(NCO) | 1:1.25 | 1:1.25 | 1:1.25 |
| Formulation | Coating KI | Coating KII | coating KIII |
| Binder | 50.0 | 50.0 | 50.0 |
| Polyisocyanate | 39.9* | 21.7* | 21.8* |
| Methoxypropyl acetate (MPAC) | 16.0* | 21.7* | 21.8* |
| Fully deionized water | 8.0 | 8.0 | |
| Total | 113.9 | 101.4 | 93.6 |
| Calculated mass fraction of solids | 36.8% | 37.2% | 40.4% |
| Pot life | About 3 h | about 30 min | about 30 min |
| Preparation | *slowly add mixture of MPAC + polyisocyanate with stirring, stir in for 5 min. | *slowly add mixture of MPAC + polyisocyanate with stirring, stir in for 5 min. | *slowly add mixture of MPAC + polyisocyanate with stirring, stir in for 5 min. |
| Drawdown onto glass plate | | | |
| Wet film thickness | 100 μm | 100 μm | 100 μm |
| Dry film thickness | 12 μm | 12 μm | 15 μm |
| Baking conditions (t at 80° C.; 150° C.; 200° C. respectively) | 30 min; 15 min; 15 min | 30 min; 15 min; 15 min | 30 min; 15 min; 15 min |
| König pendulum hardness DIN 53157 in s | 177; 190; 202 | 65; 200; 205 | 65; 175; 192 |
| Acetone test (film softening after exposure time) | 5 s; 15 s; >2 min | 5 s; 2 min; >5 min | 5 s; 45 s; >2 min |

*The polyisocyanate is diluted with methoxypropyl acetate (MPAC) before being mixed in. ® Bayhydur: hydrophilicized polyisocyanates from Bayer AG, B. VP LS 2150: based on isophorone diisocyanate trimer; B. VP LS 2219 and B 3100: based on 1,6-diisocyanatohexane trimer; each 70% mass fraction in a mixture of methoxypropyl acetate/xylene.

In the case of binders stabilized cationically by way of amines incorporated in the resin structure, the pot life is very clearly dependent on the structure and basicity of the amines used. In general it is found that primary and secondary amino groups in the resin lead to an inadequate pot life and that application is possible only using 2-component spray guns. Hydrophilicized isocyanates based on IPDI exhibit a longer pot life than hydrophilicized isocyanates based on 4,4'-diisocyanatodicyclohexylmethane.

| Anionically stabilized epoxy adducts: | | |
|---|---|---|
| Epoxy dispersion of Example | A4 | A4 |
| Polyisocyanate | Bayhydur B 3100 | Bayhydur VP LS 2219 |
| Ratio of the amounts of substance of the reactive groups n(OH):n(NCO) | 1:1.25 | 1:1.25 |
| Formulation | coating AI | coating AII |
| Binder | 50.0 | 50.0 |
| Polyisocyanate | 13.1* | 13.0* |
| Methoxypropyl acetate (MPAC) | 13.1* | 13.0* |

-continued

Anionically stabilized epoxy adducts:

| Epoxy dispersion of Example | A4 | A4 |
|---|---|---|
| Total | 76.2 | 76.0 |
| Calculated mass fraction of solids | 32.9% | 32.9% |
| Pot life | about 3 h | about 2 h |
| Processing instructions | *slowly add mixture of MPAC and polyisocyanate with stirring, stir in for 5 min. | *slowly add mixture of MPAC and polyisocyanate with stirring, stir in for 5 min. |
| Drawdown onto substrate (cold-rolled thin sheet metal 0.75 mm ST 14.03) | | |
| Wet film thickness | 80 $\mu$m | 80 $\mu$m |
| Baking conditions (t at 80° C.; 150° C.; 200° C. respectively) | 30 min; 15 min; 15 min | 30 min; 15 min; 15 min |
| Dry film thickness in $\mu$m | 10; 10; 10 | 9; 9; 9 |
| Crosshatch DIN EN ISO 2409/1 mm | Gt 0; Gt 0; Gt 0 | Gt 0; Gt 0; Gt 0 |
| Impact testing (to ASTM 2794) direct in in · lb | 80; 80; 80 | 80; 80; 80 |
| Impact testing (to ASTM 2794) indirect in in · lb | 80; 80; 80 | 80; 80; 60 |
| Drawdown onto glass plate | | |
| Wet film thickness | 100 $\mu$m | 100 $\mu$m |
| Baking conditions (t at 80° C.; 150° C.; 200° C. respectively) | 30 min; 15 min; 15 min | 30 min; 15 min; 15 min |
| Dry film thickness in $\mu$m | 18; 18; 17 | 18; 18; 17 |
| König pendulum hardness DIN 53157 in s | 165; 184; 194 | 166; 196; 204 |
| Acetone test (film softening after exposure time) | 10 s; 5 min; >10 min | 10 s; 4 min; >10 min |

*The polyisocyanate is diluted with methoxypropyl acetate (MPAC) before being mixed in. Nonionically stabilized epoxy adducts:

The binders stabilized anionically by way of the phosphate ion showed the most favorable behavior in respect of pot life and application in comparison to the cationically stabilized binders. Noteworthy is the outstanding flexibility of the films at the same time as having high pendulum hardness and excellent acetone resistance from a baking temperature of 200° C.

Nonionically stabilized epoxy adducts:

| Epoxy dispersion of Example | N1 | N1 | N1 |
|---|---|---|---|
| Polyisocyanate | Bayhydur VP LS 2150/2 | Bayhydur VP LS 2219 | Bayhydur B 3100 |
| Ratio of the amounts of substance of the reactive groups n(OH):n(NCO) | 1:1.25 | 1:1.25 | 1:1.25 |
| Formulation | Coating NI | coating NII | Coating NIII |
| Binder | 50.0 | 50.0 | 50.0 |
| Polyisocyanate | 31.9* | 17.3* | 17.4* |
| Methoxypropyl acetate (MPAC) | 12.7* | 17.3* | 17.4* |
| Fully deionized water | 20.0 | 10.0 | 10.0 |
| Leveling agent | 3.0 | 3.0 | 3.0 |
| Total | 117.6 | 97.6 | 97.8 |
| Calculated mass fraction of solids | 41.5% | 44.9% | 44.90% |
| Pot life | 3.5 h | 3 h | 3 h |
| Processing instructions | *slowly add mixture of MPAC and polyisocyanate with stirring, stir in for 5 min. | *slowly add mixture of MPAC and polyisocyanate with stirring, stir in for 5 min. | *slowly add mixture of MPAC and polyisocyanate with stirring, stir in for 5 min. |
| Drawdown onto substrate (cold-rolled thin sheet metal 0.75 mm ST 14.03) | | | |
| Wet film thickness in $\mu$m | 80 | 80 | 80 |
| Baking conditions (t at 200° C.; 240° C. in min) | 15; 15 | 15; 15 | 15; 15 |
| Dry film thickness in $\mu$m | 14; 11 | 16; 12 | 16; 15 |
| Crosshatch DIN EN ISO 2409/1 mm | Gt 0; Gt 0 | Gt 0; Gt 0 | Gt 0; Gt 0 |
| Impact testing (to ASTM 2794 direct) in in · lb | 60; 40 | 80; 80 | 80; 80 |
| Impact testing (to ASTM 2794 indirect) in in · lb | 80; 20 | 80; 40 | 80; 80 |
| Drawdown onto glass plate | | | |
| Wet film thickness in $\mu$m | 100 | 100 | 100 |
| Dry film thickness in $\mu$m | 18 | 20 | 20 |
| Baking conditions (t at 200° C.; 240° C. in min) | 15 min; 15 min | 15 min; 15 min | 15 min; 15 min |
| König pendulum hardness DIN 53157 in s | 227; 240 | 214; 225 | 205; 215 |
| Acetone test (film softening after exposure time) | 6 min; >10 min | 20 s; 3 min | 20 s; 2 min |

*The polyisocyanate is diluted with methoxypropyl acetate (MPAC) before being mixed in.

The above description of the invention is intended to be illustrative and not limiting. Various changes or modifications in the embodiments described herein may occur to those skilled in the art. These can be made without departing from the scope and spirit of the invention.

What is claimed is:

1. A two-component system based on aqueous dispersions of hydrophilic adducts Ah having hydroxyl groups as reactive groups and unblocked difunctional or polyfunctional isocyanates B, said hydrophilic epoxy adducts Ah are selected from the group consisting of cationically stabilized hydrophilic epoxy adducts Ak, which has only tertiary and no primary or secondary amino groups; anionically stabilized hydrophilic epoxy adducts Aa; nonionically stabilized epoxy adducts An, which include polyoxyalkylene segments having a mass fraction of at 20 percent of oxyethylene groups; and zwitterionically stabilized epoxy-amine adducts Aak wherein
cationically stabilized hydrophilic adducts Ak are adducts of epoxy resins A1, which have a specific epoxy group content of from 300 to about 11,500 mmol/kg, and amines A2, which have one primary or secondary amino group per molecule, but no tertiary amino groups, and the only tertiary amino groups present in adduct Ak are those formed in the addition reaction of said epoxy resins A1 and amines A2; and anionically stabilized hydrophilic epoxy adducts Aa are adducts of said epoxy resins A1 and polybasic acids A3, which are selected from the group consisting of phosphoric acid, alkylphosphonic acids of the formula $R^4PO_2H_2$, where $R^4$ is a $(C_1-C_4)$-alkyl group, arylphosphonic acids, hydroxyalkylphosphonic acids and the corresponding phosphonic acids $R^4PO_2H_2$.

2. The two-component system as claimed in claim 1, wherein the anionically stabilized adducts Aa are at least partially neutralized, wherein the degree of neutralization is between 10 and 100%.

3. The two-component system as claimed in claim 1, wherein the amines A2 employed are secondary monoamines of the formula $R^1R^2NH$, $R^1$ and $R^2$ independently of one another are linear, branched and cyclic alkyl radicals of 1 to 20 carbon atoms which are optionally substituted by at least one primary hydroxyl group.

4. The two-component system as claimed in claim 1, wherein the amines A2 employed are primary monoamines $R^3NH_2$, $R^3$ are linear, branched and cyclic alkyl groups of 2 to 20 carbon atoms with the proviso that $R^3$ carries at least one primary hydroxyl group which is positioned α or β to the primary amino group.

5. The two-component system as claimed in claim 1, wherein the amino A2 are disopropanolamine, diethanolamine, diisobutylamine, N-methylcyclohexylamine, monoiso-propanolamine and monoethanolamine.

6. The two-component system as claimed in claim 2 wherein $R^4$ is a $(C_1-C_4)$-alkyl group.

7. The two-component system as claimed in claim 2, wherein the acid number of the epoxy-acid adduct Aa is between about 15 and about 200 mg/g and wherein the epoxy-acid adduct Aa is neutralized to the extent of from about 10 to about 100%.

8. The two-component system as claimed in claim 1 wherein the anionically stabilized adducts Aa are obtainable by reacting modified epoxides A16 with polybasic acids A3, wherein the modified epoxides A16 are obtainable by reacting epoxides A1 with aliphatic monoboxylic acid having 2 to 40 carbon atoms and the polybasic acids A3 optionally in the presence of a small amount of water, wherein the polybasic acids A3 are selected from the group consisting of phosphoric acid, alkylphosphonic acids of the formula $R^4PO_3H_2$, arylphosphonic acids, phosphonous acids, $R^4PO_2H_2$, and hydroxy-$(C_{1-C4})$-alkyl phosphonic acid, and $R^4$ is a $(C_1-C_{18})$-alkyl group.

9. The two-component system as claimed in claim 8, wherein the modified epoxides A16 are in a mixture with epoxy resins A1.

10. The two-component system as claimed in claim 1, wherein the zwitterionically stabilized epoxy adducts Aak are obtainable by condensing the epoxy-amine adducts A18 and hydrolyzed adduct A12h, wherein the hydrolyzed addition products A12h are obtained by the addition reaction of maleic anhydride A123 and at least one component selected from the group consisting of drying oils A121 and unsaturated fatty acids A122 to form an adduct A12 and subsequent hydrolysis of the acid anhydride groups under the action of water or monoalcohols; and the epoxy-amine adduct A18 is obtainable by reacting epoxides A1 having a specific epoxy group content of from about 300 to about 11,500 mmol/kg with secondary amines A8 selected from secondary aliphatic amines having linear, branched or cyclic alkyl radicals.

11. The two-component system as claimed in claim 10, wherein the acid number of the condensation product Aak is from about 10 to about 100 mg/g.

12. The two-component system as claimed in claim 10, where the secondary amines A8 are linear, branched or cyclic alkyl radicals having 2 to 12 carbon atoms which are optimally substituted with at least one hydroxyl group.

13. The two-component system as claimed in claim 1, wherein the anionically stabilized epoxy resin Aa is obtainable by reaction in a two-stage reaction of a hydroxy, mercapto or amino acid A4 with an at least difunctional isocyanate A5 to form an intermediate A45 having at least one acid group and at least one isocyanate group and reacting this intermediate in a second stage with a hydroxyl-containing epoxy resin A14, where the proportions are such that in this second stage the isocyanate groups are completely consumed.

14. A binder for coating materials which comprises a two-component system according to claim 1.

15. In a method for coating a material the improvement which comprises applying a binder according to claim 14.

16. The method according to claim 15, wherein the material is a container for chemicals having an interior and an exterior and the binder is applied to the interior.

17. A container whose interior surfaces are coated with a coating material comprising a two-component system as claimed in claim 1.

* * * * *

UNITED STATES PATENT AND TRADEMARK OFFICE
CERTIFICATE OF CORRECTION

PATENT NO. : 6,350,796 B1
DATED : February 26, 2002
INVENTOR(S) : Dworak et al.

It is certified that error appears in the above-identified patent and that said Letters Patent is hereby corrected as shown below:

Title page, Item [54] and Column 1, lines 1-5,
The title should read -- IONICALLY OR NONIONICALLY STABILIZED EPOXY ADDUCTS AS WATER-DILUTABLE BASE RESINS FOR 2-COMPONENT ISOCYANATE CROSSLINKABLE SYSTEMS --

Title page,
Item [73], please delete "Vianova Resins AG" as the assignee and replace it with
-- Solutia Austria GmbH --.

Column 14,
Line 61, please insert the word -- least -- between the words "at" and "20". The sentence should read, -- ….having a mass fraction of at least 20 percent of oxyethylene… --.

Signed and Sealed this

Twenty-ninth Day of April, 2003

JAMES E. ROGAN
*Director of the United States Patent and Trademark Office*